(12) United States Patent
Brookler et al.

(10) Patent No.: US 7,664,737 B2
(45) Date of Patent: Feb. 16, 2010

(54) METHOD FOR GENERATING DOCUMENTS USING LAYER-SPECIFIC INHERITANCE RULES

(75) Inventors: David E. Brookler, Los Angeles, CA (US); Paul N. Weinberg, Los Angeles, CA (US); Dave L. Sullivan, Canoga Park, CA (US); Philip A. Tinari, Los Angeles, CA (US); Richard T. Endo, Los Angeles, CA (US); Nathan F. Yospe, Los Angeles, CA (US)

(73) Assignee: SAP, AG, Walldorf (DE)

( * ) Notice: Subject to any disclaimer, the term of this patent is extended or adjusted under 35 U.S.C. 154(b) by 367 days.

(21) Appl. No.: 11/141,997

(22) Filed: May 31, 2005

(65) Prior Publication Data

US 2006/0271523 A1    Nov. 30, 2006

(51) Int. Cl.
*G06F 7/00* (2006.01)
(52) U.S. Cl. .......................... 707/3; 707/102; 715/265
(58) Field of Classification Search ............... 707/1, 707/3, 100
See application file for complete search history.

(56) References Cited

U.S. PATENT DOCUMENTS

| 4,566,078 | A | * | 1/1986 | Crabtree | 704/8 |
|---|---|---|---|---|---|
| 5,442,782 | A | * | 8/1995 | Malatesta et al. | 707/4 |
| 5,737,726 | A | | 4/1998 | Cameron et al. | |
| 5,805,118 | A | | 9/1998 | Mishra et al. | |
| 5,835,912 | A | * | 11/1998 | Pet | 707/104.1 |
| 5,956,737 | A | | 9/1999 | King et al. | |
| 6,006,221 | A | * | 12/1999 | Liddy et al. | 707/5 |
| 6,018,742 | A | * | 1/2000 | Herbert, III | 707/102 |
| 6,370,498 | B1 | * | 4/2002 | Flores et al. | 704/3 |
| 6,418,439 | B1 | * | 7/2002 | Papierniak et al. | 707/9 |
| 6,429,879 | B1 | | 8/2002 | Sturgeon et al. | |
| 6,526,426 | B1 | | 2/2003 | Lakritz | |
| 6,532,442 | B1 | | 3/2003 | Schumacher et al. | |
| 6,623,529 | B1 | * | 9/2003 | Lakritz | 715/536 |
| 6,993,568 | B1 | * | 1/2006 | Hauduc et al. | 709/217 |
| 2002/0069049 | A1 | * | 6/2002 | Turner | 704/8 |
| 2004/0220893 | A1 | | 11/2004 | Spivack et al. | |
| 2005/0007336 | A1 | | 1/2005 | Albert et al. | |
| 2005/0071345 | A1 | * | 3/2005 | Lin | 707/100 |
| 2005/0240392 | A1 | * | 10/2005 | Munro et al. | 704/8 |
| 2006/0080285 | A1 | | 4/2006 | Chowdhuri | |

* cited by examiner

*Primary Examiner*—Pierre M Vital
*Assistant Examiner*—Augustine Obisesan
(74) *Attorney, Agent, or Firm*—Dalina Law Group, P.C.

(57) ABSTRACT

Audience specific document targeted at a particular media type are generated by accessing data from an audience hierarchy. When obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Audiences may be specified in a given order for traversal within the hierarchy and displayed in a data entry and editing application utilizing visual characteristics to inform a user if the value for a particular piece of data is inherited from another layer or utilized from the particular layer in use. Audience specific documents may be masked and accessed by payment.

20 Claims, 7 Drawing Sheets

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| ... | ... | ... | |

Figure 1

MAIN DATA TABLE

| PRODUCT_ID | NAME_ID | DESCRIPTION_ID | ... |
|---|---|---|---|
| 220304 | 17 | 334 | ... |
| 220305 | 22 | 427 | ... |

Figure 2

DATA ATTRIBUTE TABLE

| NAME_ID | AUDIENCE_ID | NAME | ... |
|---|---|---|---|
| 17 | 0 | tennis sweater | ... |
| 17 | 1 | tennis jumper | ... |
| 22 | 0 | tennis ball | ... |

Figure 3

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| … | … | … | |

Figure 4

AUDIENCE TABLE

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

METHOD FOR GENERATING DOCUMENTS USING LAYER-SPECIFIC INHERITANCE RULES

BACKGROUND OF THE INVENTION

1. Field of the Invention

Embodiments of the invention described herein pertain to the field of computer systems. More particularly, but not by way of limitation, one or more embodiments of the invention enable the generation of audience-specific documents through use layer specific inheritance rules.

2. Description of the Related Art

There are many problems associated with generating a document for multiple audiences comprising differing languages in varying media types such as an electronic or print media catalog. A document that is targeted to more than one language may also need to take into account the different regional, regulatory, and cultural requirements of the audience for which the document is published. In addition, the generated document needs to be properly formatted regardless of the media type for which the document is generated.

Current systems for generating documents fail to take into account the various complexities that cause documents to vary on a publication-by-publication basis. When publishing documents for a global audience, data that is an appropriate substitute in one instance of the document may not be an adequate substitute in a different instance. French regulations, for instance, prohibit imagery that shows a hypodermic needle whereas in other countries such images are permissible. The same concept is also applicable to language, cultural, and regional or regulatory requirements associated with a particular document. Current systems provide mechanisms for publishing documents in multiple languages, but require brute force entry of multi-lingual data in a way that tends require large amounts of duplicate operator entries for similar languages, cultural, regional or regulatory specific embodiments of a document. For example, current systems require a complete set of entries for two languages that may only differ in a small way such as United Kingdom and United States English.

Generating a document for alternate media types requires data that defines the required output format for the particular media type. Current systems that perform this function are generally hardcoded and when a particular piece of data changes, all target media documents must be manually adjusted.

Removal of support for a given audience or media type would require deleting rows or columns in a database as the database is generally structured in current systems. Adding support for a new audience or media type requires copying large amounts of data, either rows or columns using current methods.

For at least the limitations described above there is a need for system that eliminates data entry duplication and allows for the transparent generation of audience specific documents into multiple languages, regions, cultures or regulatory zones using a variety of media types.

SUMMARY OF THE INVENTION

One or more embodiments of the invention enable the generating of audience specific documents using layer-specific inheritance rules. The word "audience" for the purposes of this specification means a group of document consumers such as people or computers that are associated with a language, country, region, regulation or culture.

When generating an audience specific document targeted at a particular media type, an audience hierarchy may be created and utilized for obtaining data for a desired audience. The audience hierarchy may be implemented as a tree or linear structure or any other structure comprising at least one entry so that at least one audience may be used in obtaining data from a data attribute table. For example when obtaining a data value for a particular audience, if that value does not exist for that audience then the audience hierarchy may be utilized to find the data value for an inherited audience. By adding regional, cultural or regulatory subdivisions within the audience hierarchy and inheriting large portions of existing audience specific data entries, a large number of audience specific documents may be generated with a minimal amount of data entry required. Audiences may be specified in a given order for traversal within the hierarchy and used in order to display data with visual characteristics to inform a user if the value for a particular piece of data is being used from the current layer or is inherited. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not altered when adding an audience, attributes are added where needed to the attribute table and an audience is defined in the audience table.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience.

Once the audience hierarchy is set up, entry and edit of data occurs in one or more embodiments of the invention after selecting a given audience identifier for interaction with the system. The audience identifier may be entered manually or automatically from the user or computer associated with a user. The audience identifier may specify the language, or the language and country, or the language, country and region, or the language, region and culture, or the culture and regulatory area or any other combination of audience identifying values. A document may be published at any time using the data entered and edited in the system.

Audience specific documents may be generated for publication by obtaining an audience identifier or audience order from an audience order table or structure. The order specifies the actual audience to utilize when accessing a data attribute table or data table comprising values for at least one audience. The value specific to a given audience is obtained from the data table using the first audience order identifier and the reference identifier of the value from a main data table. If the value exists, it is returned. If the value does not exist for a given audience order identifier and reference, then the audience order table may be accessed in order to find the next audience that may comprise the value. The next position found in the audience order table for a given audience identifier is utilized in order to access the data table. The processing repeats until a value is found or a stop flag is found in which case no value is supplied. Stop flags may be utilized in the audience hierarchy to allow for a user interface data entry and editing application to show all inherited values and yet allow for the non-publication of inherited values past a set level of inheritance in a generated document. In the remainder of this specification, use of tables and structures is synonymous unless specified otherwise.

Adding support for document for a given audience using embodiments of the invention is rapid as there is no need to add multiple rows for each entry in the main data table or add and populate fields in a main data table for each new audience. The data attribute table may be augmented with only those values that are unique to the new audience with respect to a set of data values corresponding to an audience that already exists in the data table. The main data table does not require altering in any way in order to add support for a new audience. For an audience that comprises all of the data of another audience for the data that currently exists in a main data table, the initial position set for the initial audience order identifier may be that of an entirely different audience meaning that the audience is being substituted for outright. When a data entry is added to the data attribute table that is different with respect to the first position audience for a given reference id then a new data attribute table entry may be created. In addition, the audience order identifier can be altered to use the child audience first. All other entries in the attribute data table would be obtained in this example by observing that the values do not exist for the specific child audience identifier and that the second audience order identifier corresponding to a parent is utilized to obtain these entries. In this manner, only one entry in a data attribute table separate from the main data table is added while the audience order table is updated to allow for the traversal to another audience when entries are not found for a given audience. The number of data entries in the data attribute table for each supported audience in general differs for audiences that inherit from each other with more dependent audiences having less entries in general.

Generation of an audience specific document may occur by traversing an audience hierarchy comprising audiences that may be enabled or disabled. Masking may be utilized in order to allow only certain portions of the audience specific document or certain variants of the audience specific document to be generated. Users may pay for access to a particular audience and may pay a separate fee for access to a second audience version of the document depending on the embodiment.

DETAILED DESCRIPTION OF THE INVENTION

A method for generating audience specific documents using layer-specific inheritance rules will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
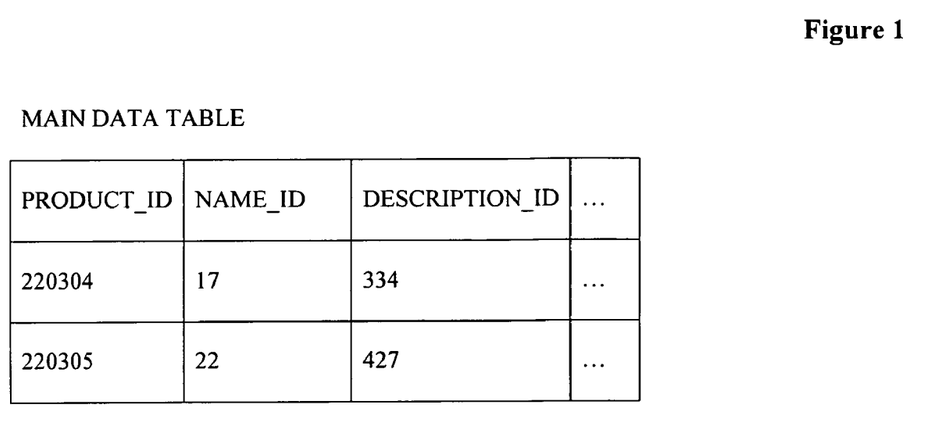
FIG. 1 illustrates a main data table used in conjunction with one or more embodiments of the invention.
Figure 2:
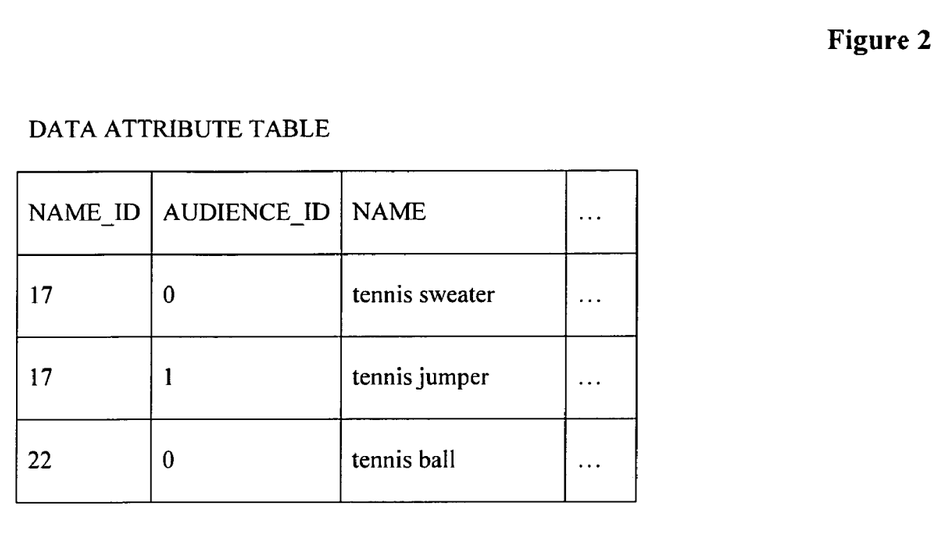
FIG. 2 illustrates a data attribute table used in conjunction with one or more embodiments of the invention.
Figure 3:
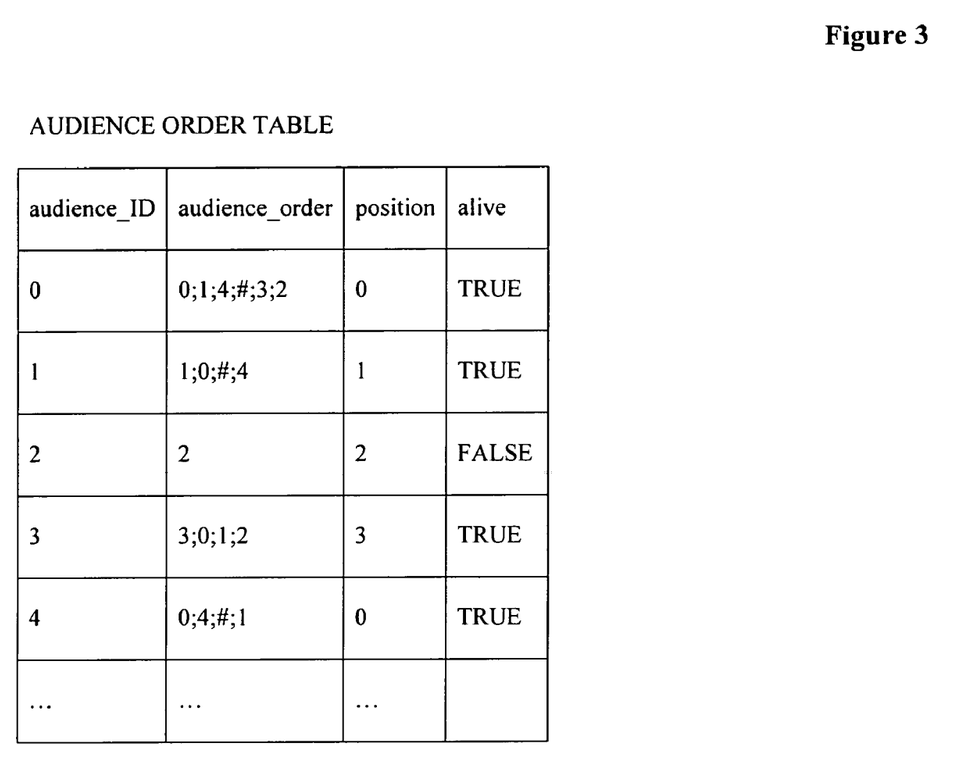
FIG. 3 illustrates an audience order table used in conjunction with one or more embodiments of the invention.

One or more embodiments of the invention utilize an audience hierarchy when generating an audience specific document targeted at a particular media type. The audience hierarchy may be implemented as a tree or linear structure or any other structure comprising at least one entry so that at least one audience may be used in obtaining data from a data attribute table. FIG. 1 shows a main data table comprising products for example. The name of a product in this example is entered into another table namely the data attribute table shown in FIG. 2. For each audience that has a unique value for the given data attribute, an entry in the data attribute table may be created. For example product number 220304 shown in the main data table comprises an audience specific name that is obtained from the data attribute table when generating a document. In this case if the audience identifier is 0 then the name "tennis sweater" is obtained. If the audience identifier is 1 then the name "tennis jumper" is obtained. For example when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name, the audience order table shown in FIG. 3 is referenced in order to obtain the next audience identifier to use in finding a suitable value via inheritance. Since the next value in the audience order field for audience 1 is 0, then audience 0 is used in looking-up the value next in the data attribute table. In this way, only one entry for a given data entry is required since multiple audiences can share the value. By adding regional, cultural or regulatory subdivisions within the audience hierarchy and inheriting large portions of existing audience specific data entries, a large number of audience specific documents may be generated with a minimal amount of data entry required.

Audiences may be specified in a given order for traversal within the hierarchy and used in order to display data with visual characteristics to inform a user if the value for a particular piece of data is being used from the current layer or is inherited. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. For example as shown in FIG. 2, by adding any value such as was done for name identifier 22, that value is available to all audiences that comprise the audience 0 in their inheritance chain as shown in FIG. 3. The main data table shown in FIG. 1 is not altered when adding a new audience, instead only attributes are added to the data attribute table shown in FIG. 2, an audience is defined in the audience table in FIG. 4 and the audience is added to the audience order table shown in FIG. 3.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. In the example shown in FIG. 2, if there a thousand separate entries related to tennis and only a few of the items differ in name between audiences, then the second audience addition comes at very little expenditure of labor in entering the data that differs.

Figure 4:
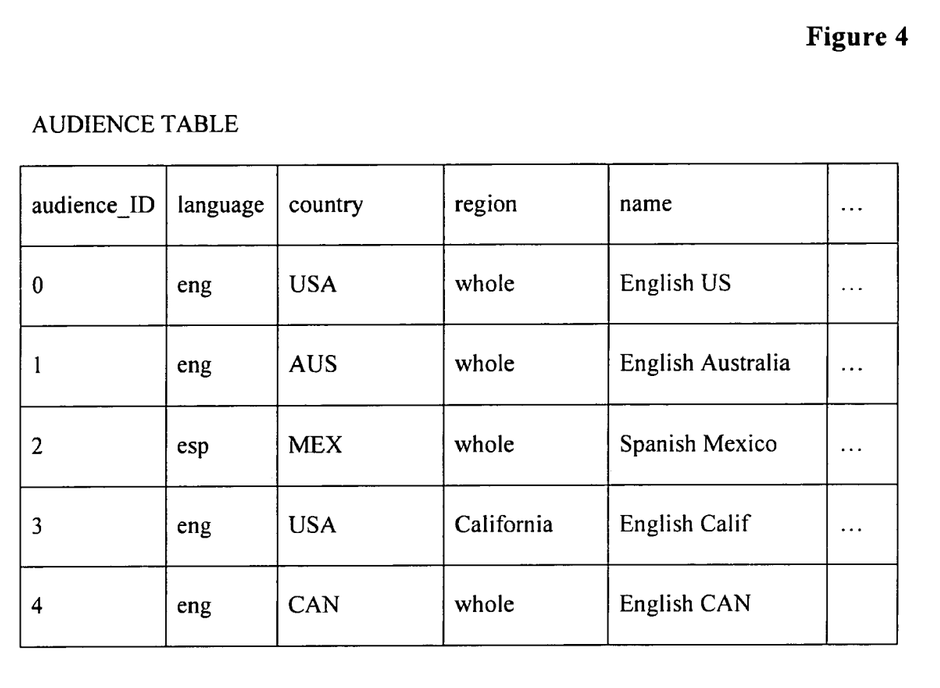
FIG. 4 illustrates an audience table used in conjunction with one or more embodiments of the invention.

Once the audience hierarchy is set up, entry and edit of data occurs in one or more embodiments of the invention after selecting a given audience identifier for interaction with the system. The audience identifier may be entered manually or automatically from the user or computer associated with a user. The audience identifier may specify the language, or the language and country, or the language, country and region, or the language, region and culture, or the culture and regulatory area or any other combination of audience identifying values. A document may be published at any time using the data entered and edited in the system. FIG. 4 shows some example audiences that comprise languages, countries and regions. This table could also comprise audiences for dry and wet counties for example and the data entries for documents generated for dry counties could comprise NULL values wherever an alcoholic beverage or description would appear in the document.

Figure 5:
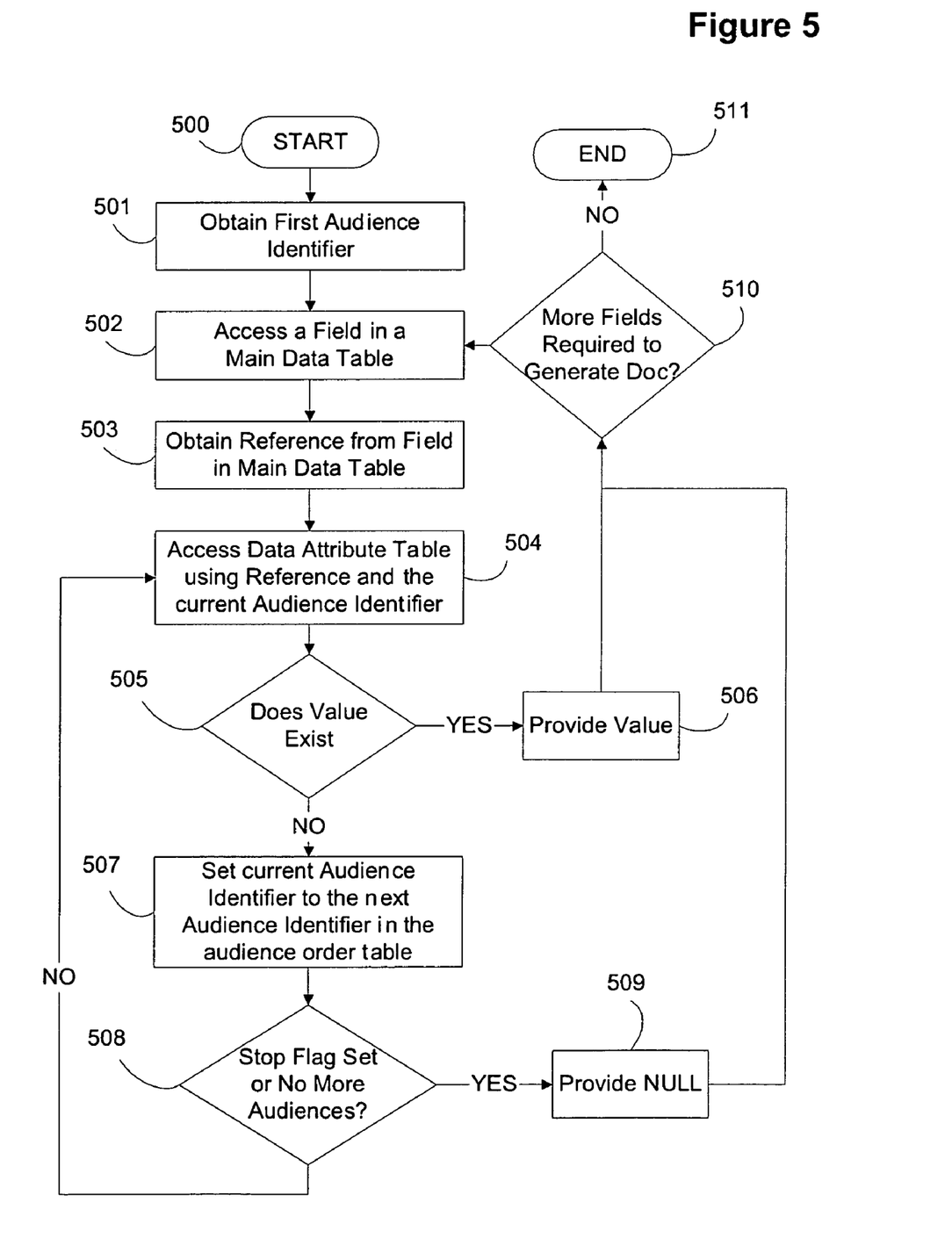
FIG. 5 illustrates a flow chart describing the steps for generating an audience specific document value based on an audience identifier and an attribute identifier.

FIG. 5 illustrates a flow chart describing the steps for generating an audience specific document value based on an audience identifier and an attribute identifier. After starting at 500, audience specific documents may be generated for publication by obtaining an audience identifier at 501. After accessing a field in a main data table at 502, and obtaining a reference identifier from the field in the main data table at 503, the attribute data table is accessed using the reference and audience identifiers at 504. If a value is found then the value is provided at 506 to the module requesting values, and a check to determine if there are more fields requested in the document to be generated at 510. If there are no more fields required to generate a document then processing ends at 511. If there are more fields required to generate a document then processing continues at 502. If no value exists at 505, then the audience order table or structure is accessed in order to determine the next audience identifier in the inheritance chain to use in accessing the data attribute table at 507. If a stop flag is encountered and the mode of operation is for document generation or if there are no more audiences in the inheritance chain then a null value is returned at 509. At this point, the check to determine if there are more fields requested in the document to be generated at 510 is performed. If there are no more fields required to generate a document then processing ends at 511. If there are more fields required to generate a document then processing continues at 502. If another audience value is encountered at 508, then processing continues at 504 with an access in the data attribute table with the newly obtained audience identifier.

Figure 6:
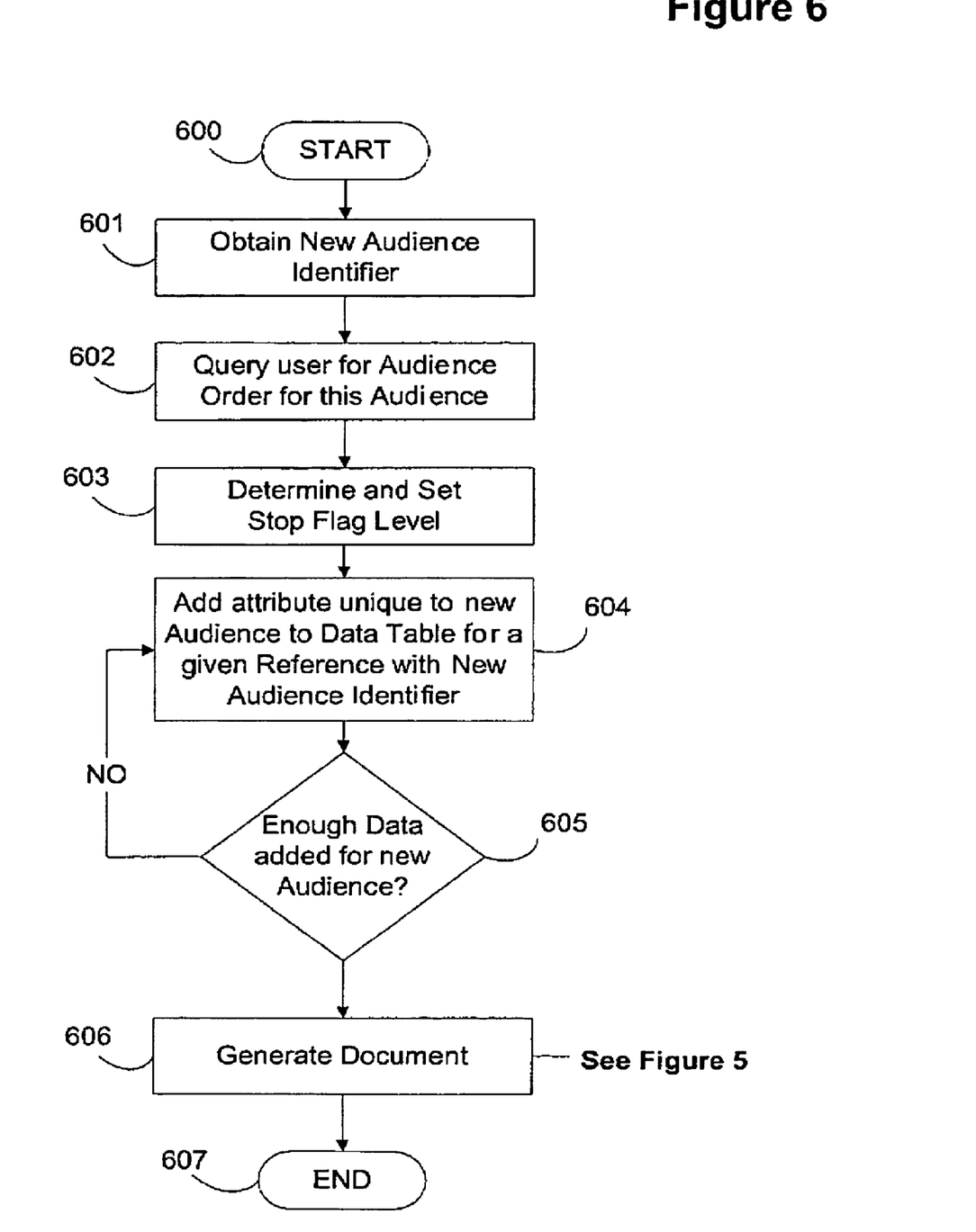
FIG. 6 illustrates a flow chart describing the steps for adding support for a new audience in order to generate a document for the new audience.

FIG. 6 illustrates a flow chart describing the steps for adding support for a new audience in order to generate a document for the new audience. Adding support for a document for a given audience using embodiments of the invention is rapid as there is no need to add multiple rows for each entry in the main data table or add and populate fields in a main data table for each new audience. Processing starts at 600 with a new audience identifier and associated data entered into the system. See FIG. 4 for an exemplary audience table. The order of the audiences to use in finding values in the data attribute table using reference and audience identifiers is obtained at 602. The stop flag level can be input at 603 although this step is optional. The stop flag allows for generated documents to obtain null values for data but allows for the data entry program itself to still obtain values lower in the inheritance chain and display them for example in a different color. The data attribute table may be augmented with only those values that are unique to the new audience with respect to a set of data values corresponding to an audience that already exists in the data table at 604. The main data table does not require altering in any way in order to add support for a new audience. For an audience that comprises all of the data of another audience for the data that currently exists in a main data table, the initial position set for the initial audience order identifier may be that of an entirely different audience meaning that the audience is being substituted for outright. This would mean that the first audience used in obtaining a value from the data attribute table would be a presumably more heavily populated audience so that first accesses in the data attribute table would provide non-null data. If enough desired data is added to the system for a given audience as determined by a user at 605 then a document may be generated at 606.

Figure 7:
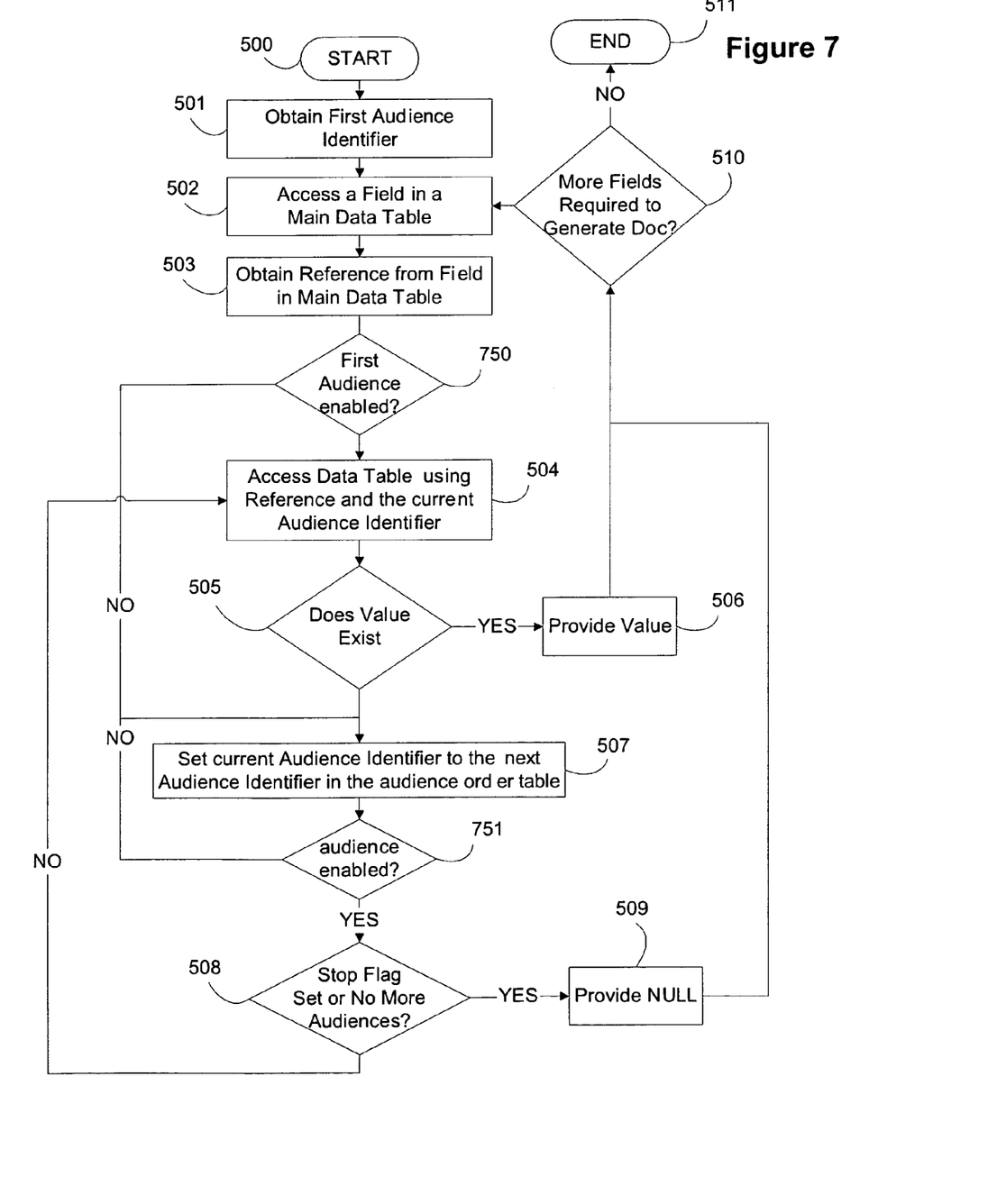
FIG. 7 shows checks for an audience enabled flag at 750 and 751.

Additionally, generation of an audience specific document may occur by traversing an audience hierarchy comprising audiences that may be enabled or disabled. FIG. 7 shows checks for an audience enabled flag at 750 and 751. Processing occurs as per FIG. 5 except that the audience identifiers are checked to determine if the corresponding audiences are disabled. If they are disabled then access to the data attributes table at 504 does not occur since there is no audience identifier enabled. Processing transfers to 507 whenever an audience is found to be disabled so that the next audience can be determined from the audience order table. In addition, masking may be utilized in order to allow only certain portions of the audience specific document or certain variants of the audience specific document to be generated and users may pay for access to a particular audience generated document and may pay a separate fee for access to a second audience version of the document depending on the embodiment.

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 091960,902 entitled "Method And Apparatus For Structuring, Maintaining, And Using Families Of Data" filed Sep. 20, 2001, U.S. patent application Ser. No. 10/022,056 entitled "Method And Apparatus For Transforming Data" filed Dec. 12, 2001, U.S. patent application Ser. No. 091960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference.

While the invention herein disclosed has been described by means of specific embodiments and applications thereof, numerous modifications and variations could be made thereto by those skilled in the art without departing from the scope of the invention set forth in the claims.

What is claimed is:

1. A method for generating documents using layer-specific inheritance rules using a computer system, said method comprising:
   constructing a main data table for said document that does not require altering in any way in order to add support for a new audience;
   constructing a data attribute table that contains audience specific names for at least some fields in said main data table;
   constructing an audience order table that contains the next audience identifier to use in finding a suitable value by inheritance;
   obtaining a new audience identifier associated with a new audience;
   querying a user for a new audience order associated with said new audience identifier,
   obtaining said new audience order from said user wherein said new audience order comprises an ordered list of at least one audience identifier and inserting said new audience order into said audience order table;
   accepting a subset of data for an audience with respect to another audience into said data attribute table wherein said subset of data is unique with respect to said another audience, wherein new audience data not contained in said subset of data is inherited from at least one other parent audience, wherein said audience and said another audience differ in one of more of language, country, region, regulatory, or cultural designations, wherein said data attribute table is augmented only with those said subset of data values that are unique to said new audience; and,
   generating a document with said subset of data associated with said new audience and with existing data associated with an existing audience when said subset of data is not found in said data attribute table for said new audience.

2. The method of claim 1 further comprising:
   determining a stop flag level for said new audience and setting said stop flag level in said audience order table.

3. The method of claim 1 further comprising:
   repeating said adding said subset of data until enough data exists to generate a document for said new audience, and wherein not all data attributes need to be updated for said new audience.

4. The method of claim 1 further comprising:
   disabling support for said new audience by setting a disable flag for said new audience in an audience table.

5. The method of claim 1 further comprising:
   enabling support for said new audience by setting an enable flag for said new audience in an audience table.

6. A method for generating documents using layer-specific inheritance rules using a computer system, said method comprising:
   constructing a main data table for said document that does not require altering in any way in order to add support for a new audience;
   constructing a data attribute table that contains audience specific names for at least some fields in said main data table;
   constructing an audience order table that contains the next audience identifier to use in finding a suitable value by inheritance;
   accepting a subset of data for an audience with respect to another audience into a data attribute table wherein said subset of data is unique with respect to said another audience, wherein new audience data not contained in said subset of data is inherited from at least one other parent audience and wherein said audience and said another audience differ in one or more of language, country, region, regulatory, or cultural designations, wherein said data attribute table is augmented only with those said subset of data values that are unique to said new audience;
   obtaining a first audience identifier and setting a current audience identifier to said first audience identifier;
   accessing a first field in a main data table in a database;
   obtaining a reference identifier from said first field in said main data table;
   accessing said data attribute table using said reference identifier and said current audience identifier to obtain a first audience specific value;
   determining if said first audience specific value exists in said data attribute table;
   providing said first audience specific value if said first audience specific value has been determined to exist via said determining step;
   setting said current audience identifier to a next audience order identifier obtained from a next position from an audience order table if said first audience specific value has been determined to not exist via said determining step;
   repeating said accessing said data attribute table, said determining if said first audience specific value exists, said providing said first audience specific value if said first audience specific value has been determined to exist until all audience order identifiers having said audience identifier have been accessed; and,
   repeating said accessing said first field in said main data table in said database and said obtaining said reference identifier from said first field and said accessing said data attribute table, said determining if said first audience specific value exists, said providing said first audience specific value if said first audience specific value has been determined to exist until all audience order identifiers having said audience identifier have been accessed and until all fields have been accessed for a first document.

7. The method of claim 6 further comprising:
   accessing an audience table to determine if an audience is enabled.

8. The method of claim 6 further comprising:
   accepting payment for access to audience specific information.

9. The method of claim 6 further comprising:
generating a document into a desired media type.

10. The method of claim 9 wherein said media type is print.

11. The method of claim 9 wherein said media type is XML.

12. The method of claim 9 wherein said media type is HTML.

13. The method of claim 6 further comprising:
said obtaining said audience identifier further comprising presenting a user interface to a user.

14. The method of claim 6 further comprising:
said obtaining said first audience identifier further comprising obtaining information from an environment variable on a computer associated with a user.

15. The method of claim 6 further comprising:
said obtaining said audience identifier further comprising obtaining information from a browser session variable.

16. A method for providing an audience specific product name from an audience order hierarchy in computer database using layer-specific inheritance rules, said method comprising:
constructing a main data table for said computer database that does not require altering in any way in order to add support for a new audience;
constructing a data attribute table that contains audience specific names for at least some fields in said main data table;
constructing an audience order table that contains the next audience identifier to use in finding a suitable value by inheritance;
accepting a subset of data for an audience with respect to another audience into said data attribute table wherein said subset of data is unique with respect to said another audience, wherein new audience data not contained in said subset of data is inherited from at least one other parent audience, and wherein said audience and said another audience differ in one or more of language, country, region, regulatory, or cultural designations, wherein said data attribute table is augmented only with those said subset of data values that are unique to said new audience;
obtaining a first audience identifier and a product identifier for the purpose of providing a product name associated with an audience from an audience order hierarchy for use in document generation;
querying said main data table for a name identifier associated with said product identifier;
querying said data attribute table a first time for said product name associated with a first data attribute entry comprising said name identifier and said first audience identifier;
querying said audience order table for an audience order entry comprising said first audience identifier and an audience order field when said first data attribute table query returns a null result;
selecting a second audience identifier from said audience order field wherein said selected second audience identifier follows sequentially from said first audience identifier in said audience order field;
querying said data attribute table a second time for a second data attribute entry comprising said second audience identifier and said name identifier;
providing said product name from said second data attribute entry when said second data attribute table query returns a non-null result.

17. The method of claim 16 further comprising:
repeating the query of said data attribute table for a third time as specified when said second data attribute entry returns a null result.

18. The method of claim 16 further comprising:
halting the querying of said data attribute table when said audience order entry comprises a stop flag; and
providing instead a failure result for said product name.

19. The method of claim 16 further comprising:
halting the querying of said data attribute table when said audience order entry comprises a disable flag; and
providing instead a null string for said product name.

20. The method of claim 2, further comprising:
if said stop flag level in said audience order table is set, then obtaining and displaying values lower in an inheritance chain in a data entry program in a different color.

\* \* \* \* \*